(12) United States Patent
Howell

(10) Patent No.: US 11,877,570 B2
(45) Date of Patent: Jan. 23, 2024

(54) UTILITY RACK

(71) Applicant: MULTBAR ROD RACK LLC, Keokuk, IA (US)

(72) Inventor: Colton L. Howell, Keokuk, IA (US)

(73) Assignee: MULTBAR ROD RACK LLC, Keokuk, IA (US)

( * ) Notice: Subject to any disclaimer, the term of this patent is extended or adjusted under 35 U.S.C. 154(b) by 0 days.

(21) Appl. No.: 17/670,200

(22) Filed: Feb. 11, 2022

(65) Prior Publication Data

US 2022/0256829 A1    Aug. 18, 2022

Related U.S. Application Data

(60) Provisional application No. 63/149,085, filed on Feb. 12, 2021.

(51) Int. Cl.
*A01K 97/10* (2006.01)

(52) U.S. Cl.
CPC .................................. *A01K 97/10* (2013.01)

(58) Field of Classification Search
CPC ...................................................... A01K 97/10
USPC .... 248/276.1, 281.11, 125, 121, 282, 278.1; 211/70.8
See application file for complete search history.

(56) References Cited

U.S. PATENT DOCUMENTS

| | | | | |
|---|---|---|---|---|
| 2,466,722 A * | 4/1949 | May | ........................ | F21V 21/26 248/278.1 |
| 4,844,387 A * | 7/1989 | Sorgi | ..................... | F16M 13/00 108/5 |
| 4,877,164 A * | 10/1989 | Baucom | ................. | B60N 3/101 224/544 |
| 4,964,233 A * | 10/1990 | Benson | .................. | A01K 97/10 43/17 |
| 5,014,458 A * | 5/1991 | Wagner | .................. | A01K 97/10 43/21.2 |
| 5,109,411 A * | 4/1992 | O'Connell | ......... | F16M 11/2021 379/454 |
| 5,201,896 A * | 4/1993 | Kruszewski | ........... | F16M 11/10 248/278.1 |
| 5,207,791 A * | 5/1993 | Scherbarth | ............ | F16M 11/00 224/678 |
| 5,557,877 A * | 9/1996 | Colson | ................... | A01K 97/10 248/512 |
| 5,685,107 A * | 11/1997 | Sweet | ..................... | A01K 97/10 43/21.2 |
| 6,367,756 B1 * | 4/2002 | Wang | ................... | F16M 13/022 248/278.1 |
| 6,718,682 B1 * | 4/2004 | Seitsinger | .............. | A01K 97/10 248/513 |
| 7,578,490 B2 * | 8/2009 | Kim | ..................... | F16M 11/105 248/278.1 |
| 8,556,143 B2 * | 10/2013 | Gold | ...................... | B62K 21/12 224/413 |
| 9,933,109 B2 * | 4/2018 | Moore | .................. | F16M 11/08 |
| 2003/0075653 A1 * | 4/2003 | Li | ...................... | F16M 11/2092 248/231.71 |

(Continued)

*Primary Examiner* — Kimberly T Wood
(74) *Attorney, Agent, or Firm* — SHUTTLEWORTH & INGERSOLL, PLC; Elizabeth L. Souer

(57) ABSTRACT

A rod rack system including a base, base block, at least one rounded arm, a top block and a top bar. The base block and top block allow the rod rack to adjust in all directions for flexibility. The rod rack system combines full adjustability with strength for use in a variety of fishing activities.

20 Claims, 8 Drawing Sheets

(56) References Cited

U.S. PATENT DOCUMENTS

| | | | | |
|---|---|---|---|---|
| 2006/0086883 A1* | 4/2006 | Moses | ............... | A01K 97/125 248/528 |
| 2008/0029669 A1* | 2/2008 | Olah | ............... | F16M 11/2014 248/276.1 |
| 2008/0197256 A1* | 8/2008 | Hirschhorn | ......... | F16M 11/041 248/276.1 |
| 2010/0275821 A1* | 11/2010 | Lebel | ............... | A47B 23/043 108/28 |
| 2017/0367311 A1* | 12/2017 | Zale | ............... | A01K 97/06 |

* cited by examiner

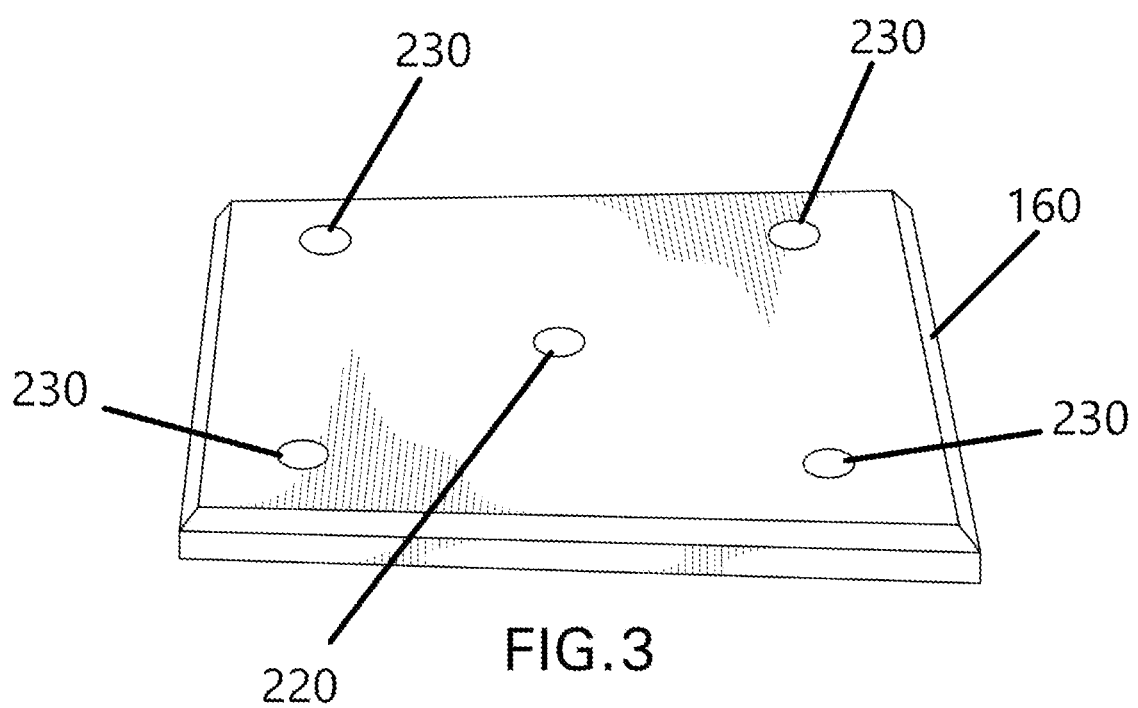

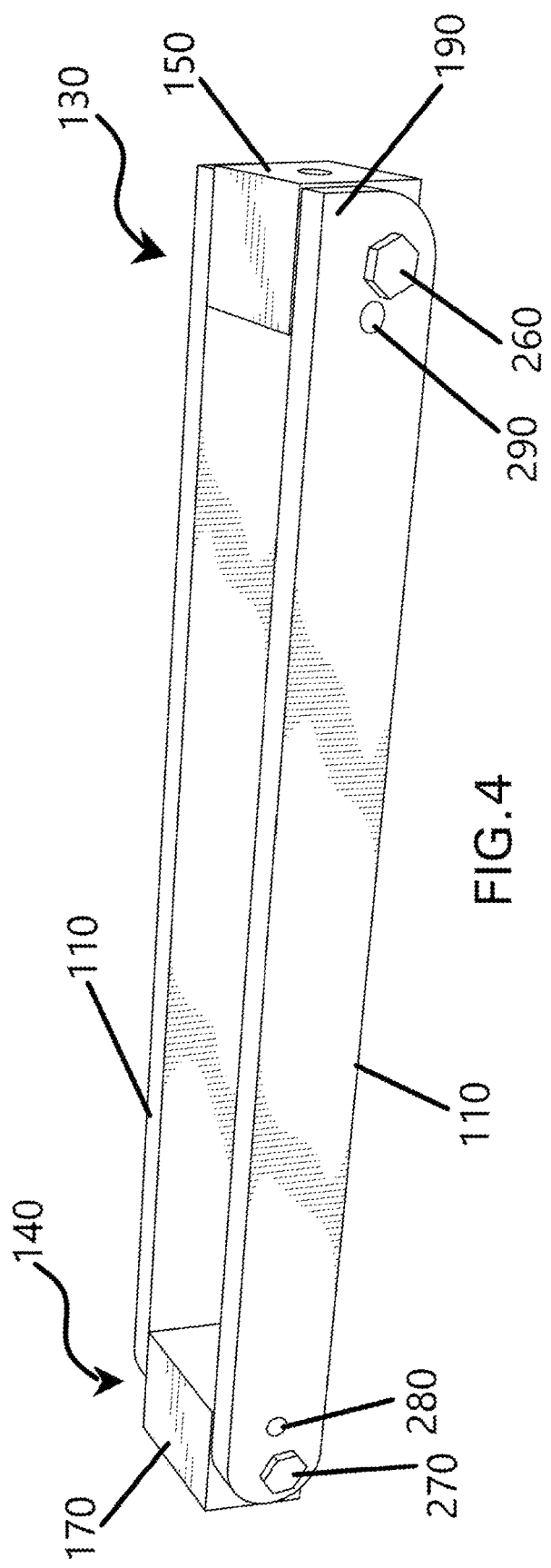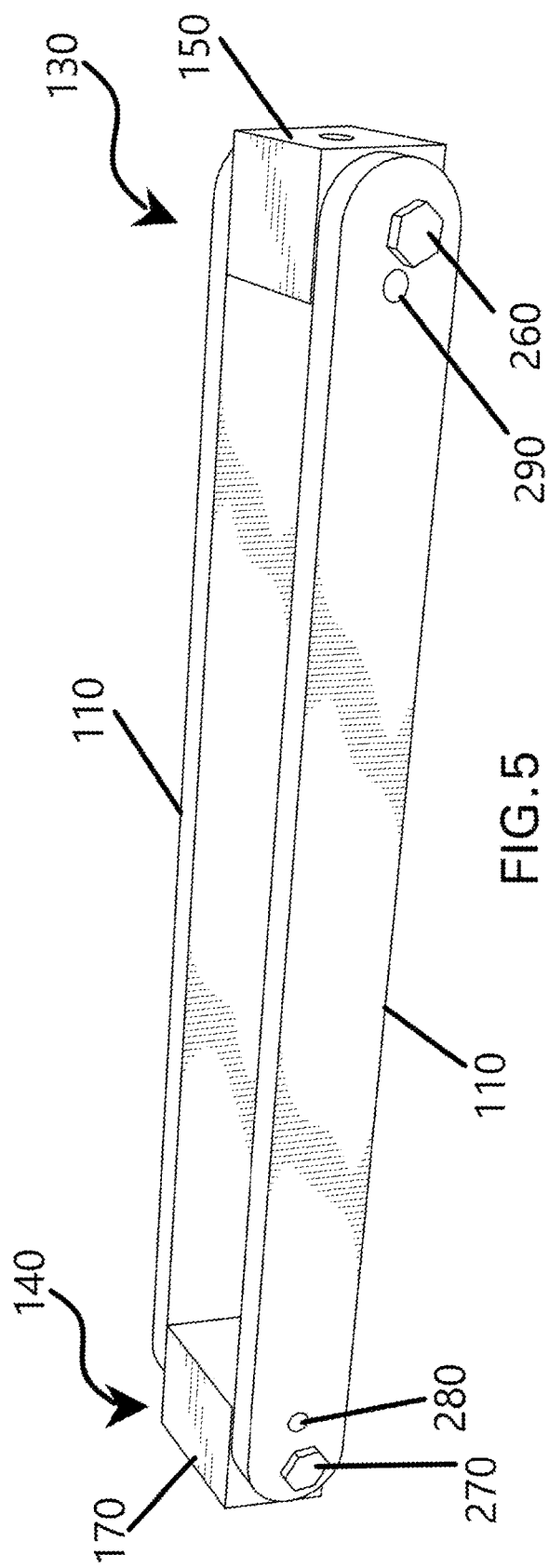

UTILITY RACK

This application claims priority under 35 USC 119 to Provisional Patent Application Ser. No. 63/149,085 filed on Feb. 12, 2021, the contents of which are hereby incorporated by reference.

BACKGROUND OF THE INVENTION

Fishing anglers have long seen a need for fishing rod racks, whether freestanding or attached to boats or docks in order to stabilize rods before, during, and after fishing. Such rod racks may include racks standing rods on end, or holders positioning rods horizontally or angularly to hold the rod while the line is trawling.

Typically rod racks are stationary and mounted on a boat. Rod racks may be mounted by screws, bolts, or other fasteners or by adhesives. Removal from the boat can be time consuming, or a quick removal may include only partially removing the rod rack. Moreover, once the rod rack is removed, it may take up a great deal of space on the boat.

Rod racks may be used for a variety of types of fishing. Typically different rod racks may be needed depending on the size, shape, and weight of the desired fish. In addition, important considerations include the size of the rod, the boat, whether the water is a lake, stream, river, or the ocean, and the size of the angler. Each of these factors may contribute to the choice of which rod rack design is preferable to increase chances of success.

Rod racks typically include a cross bar at the top and an arm, with cradles at the cross bar for holding rods, and a base at the bottom end of the arm, connected to the boat. Rod racks of this type are typically welded such that the cross bar is in a fixed position with respect to the arm and/or the base. A fixed cross bar makes it difficult to adjust the height, angle, or lateral positioning of the rod rack, and thereby, the position of the rod on the holder. The fixed design also contributes to motion transfer of the rods during bites. However, during a bite it is important for the rod rack to remain steady and not move or adjust in response to the bite, therefore a stationary rod rack does allow for greater support when an angler does get a bite. Therefore an ongoing problem is having an adjustable rack that also provides the necessary support for the rods and reduces motion transfer during a bite.

Others have tried to solve this problem and have offered improved designs to the completely fixed rod rack and base. For example, OUTTALINERODRACKS "Big T" rack includes a single, hollow bar "tube system" rod rack that adjusts up and down between predrilled holes. Movements are limited to up, down, and sideways motions of only the top bar. Movement can only occur from one predrilled hole to another. The entire rack cannot be tilted from side to side or up and down, nor any movement in between. The top bar also does not tilt because it is welded to the inner tube. The top bar is secured using a cautery key. There is also considerable amount of transfer during bites or any movement with the rod rack itself. This rod rack disassembles and may be removed from the boat fairly quickly. However, quick removal still leaves the base which has a welded tube sticking up. This is potentially unsafe and certainly not ideal for other uses of the boat. This rod rack is not intended to be used for spyder rigging. There is a plastic knob used to tighten bolt.

Another rod rack, Monster Rod racks "Corner T Bars" resembles a "T" but the top bar is shaped like a horizontal "V". It is a welded system and does not adjust at all. It is also not intended to be used for spyder rigging.

Another rod rack, the Driftmaster "T-Bars", is not fully adjustable. The Driftmaster uses a hollow tube system, and includes separate products for spyder rigging and trolling racks. The Millennium Marine "Spyder-Lok Rod rack" is also not fully adjustable and adjusts similar to the OUTTALINERODRACKS "Big T" T bars. The Millennium Marine is designed only for use in spyder rigging and also uses a plastic knob used to tighten bolts.

SUMMARY OF THE INVENTION

The rod rack 100 disclosed herein provides total adjustability in conjunction with stability and support to at least one fishing rod or other equipment 180. The at least one rounded arm 110 rotates freely around, forward, backward, and at any angle with respect to the base plate 160. Moreover, the at least one rounded arm may be set and stabilized at any angle with respect the base plate 160. The rod rack 100 disclosed herein can also be removed and collapsed to stow on the boat 200 without taking up a large amount of space.

BRIEF DESCRIPTION OF THE DRAWINGS

FIG. 3 is view of the base plate;

FIG. 4 shows two rounded arms with the top block assembly and the base block assembly with a flat edge 190;

FIG. 5 shows two rounded arms with the top block assembly and the base block assembly with a rounded edges;

DETAILED DESCRIPTION OF THE INVENTION

Figure 1:
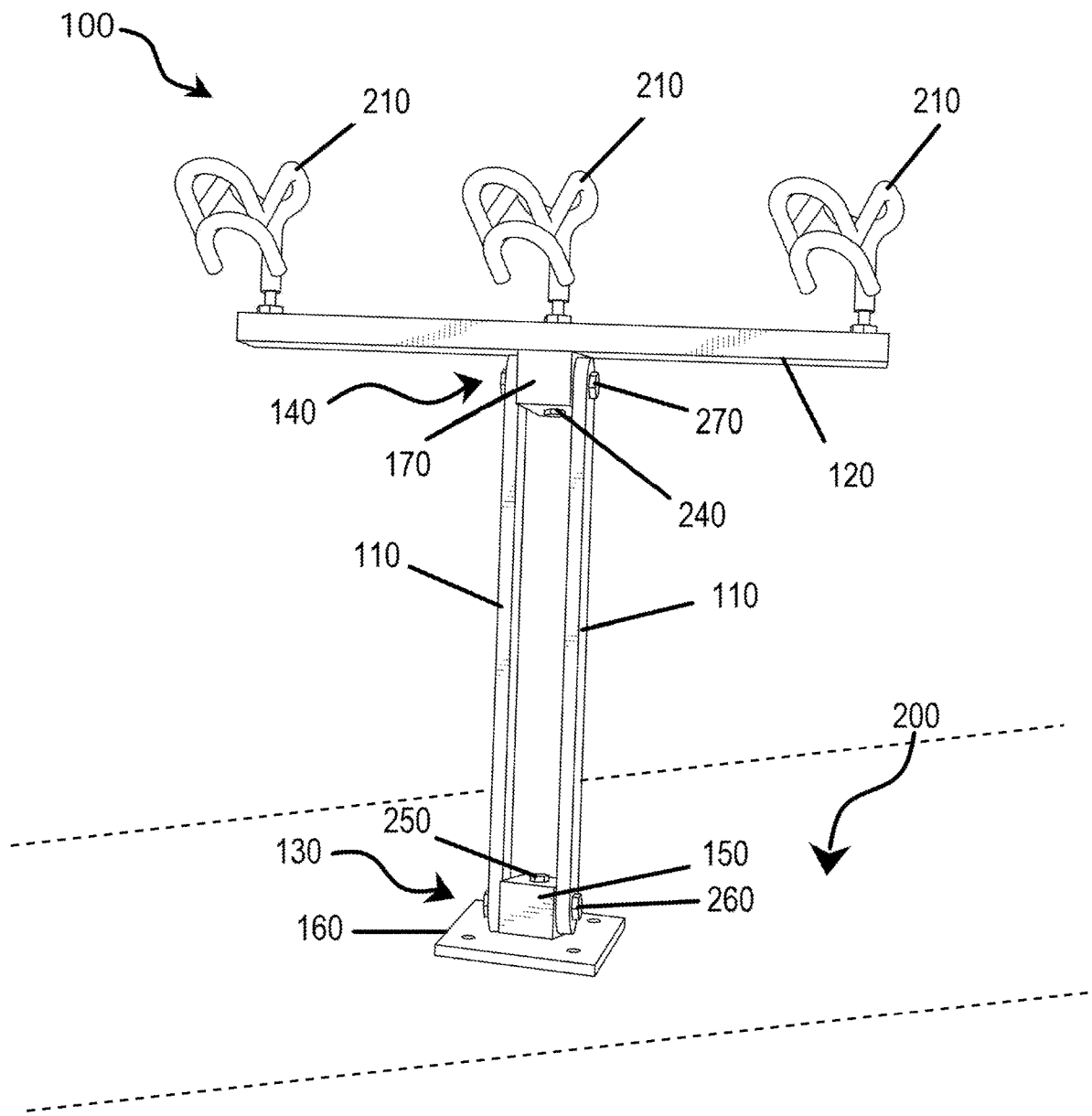
FIG. 1 is an isometric view of the rod rack with two rounded arms.

The rod rack 100 disclosed herein is a fully adjustable, weldless rack using a base block assembly 130, rounded arms 110, and a top bar 120. FIG. 1. Shows the at least one rounded arm 110 connected to the base plate 160 of the rod rack 100 via the base block assembly 130. The base block assembly 130 allows the at least one rounded arm 110 to rotate around, adjust side to side, forward, backward, and at any angle with respect to the base plate 160. The rod rack 100 can be set and stabilized at any angle with respect to the base plate 160. In addition, at the other end of the at least one rounded arm 110, a top bar 120 connects with a top block assembly 140. The top block assembly 140 also allows for top bar 120 to adjust side to side, forward, backward and at any angle, and to be set and stabilized at any angle with respect to the at least one rounded arm 110. The top bar 120 can swivel in any directly and tilt back and forth. The top bar 120 may include one or more cradles 210 to hold a fishing rod in position on the rod rack 100.

Figure 2:
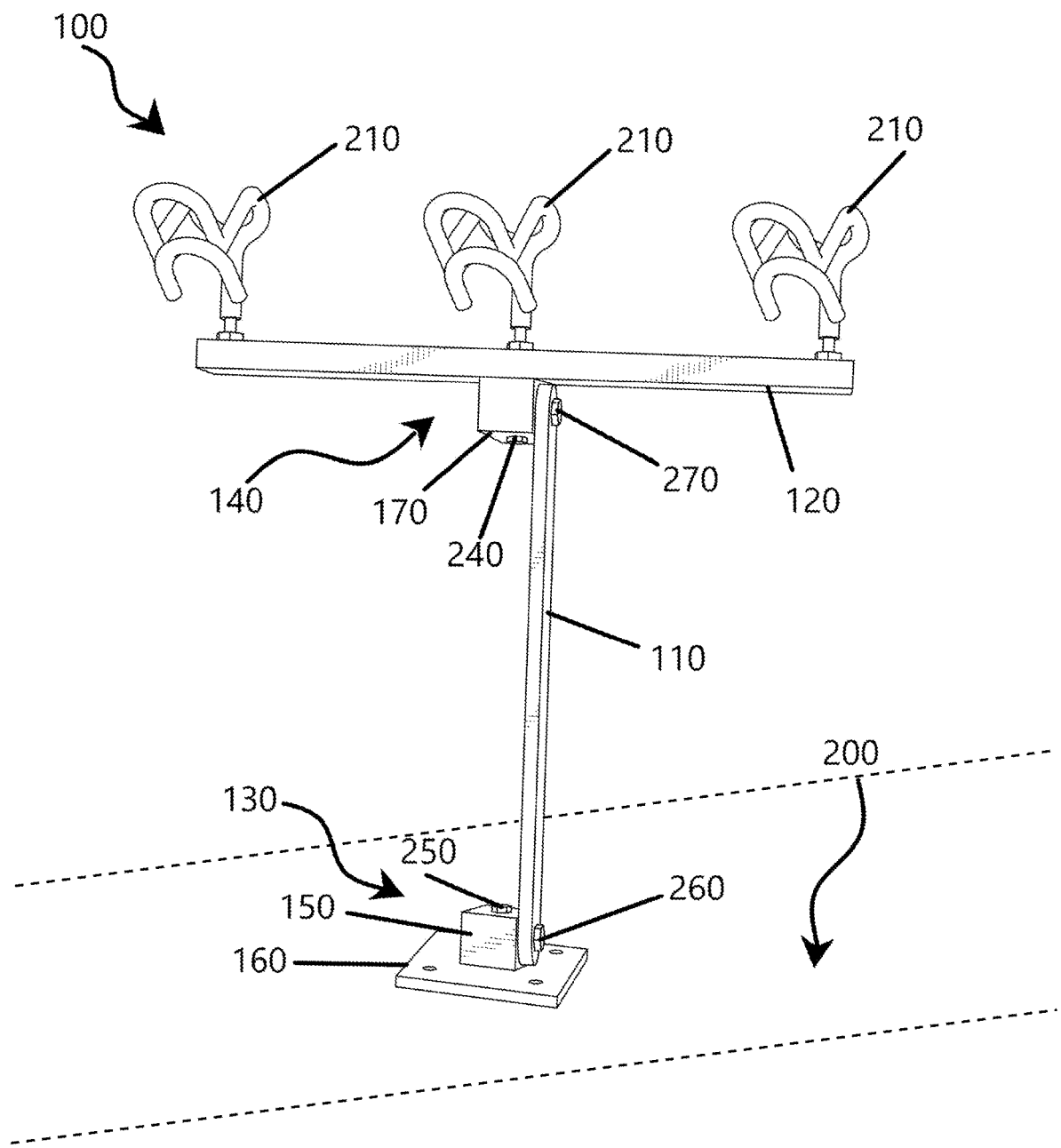
FIG. 2 is an isometric view of the rod rack with one rounded arm.

The at least one rounded arm 110 may include one rounded arm as shown in FIG. 2. The at least one rounded arm 110 include two or more rounded arms 110. FIGS. 1 and 4-7 show two round arms 110. Multiple rounded arms are advantageous over one rounded arm and may reduce the motion transfer of the rod 180 during a bite. In one embodiment, the at least one rounded arm 110 may be between 2 inches and 4 inches wide, and is preferably between 2.5 inches and 3.5 inches wide. The at least one rounded arm 110 is preferably between 0.25 inches and 0.75 inches thick. The at least one rounded arm 110 may be between any length, but is preferably between 18 inches and 30 inches long. Moreover, the base plate 160, at least one rounded arm 110, and top bar 120 may be made from metal or any hard plastic or polymer. In one embodiment, the base plate 160, the at least one rounded arm 110, and the top bar 120 may be made with a soft metal such as aluminum or an aluminum alloy.

Figure 10:
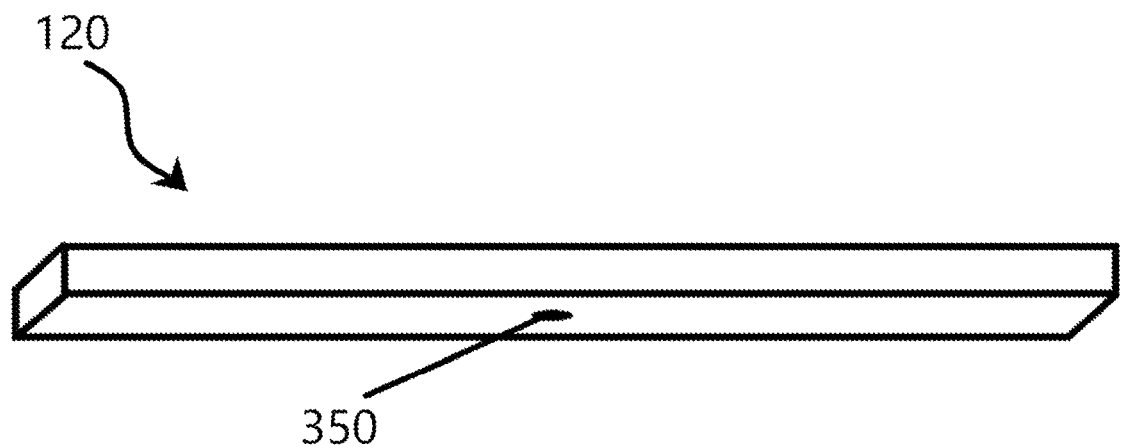
FIG. 10 is a view of the top bar showing the top bar channel.
Figure 11:
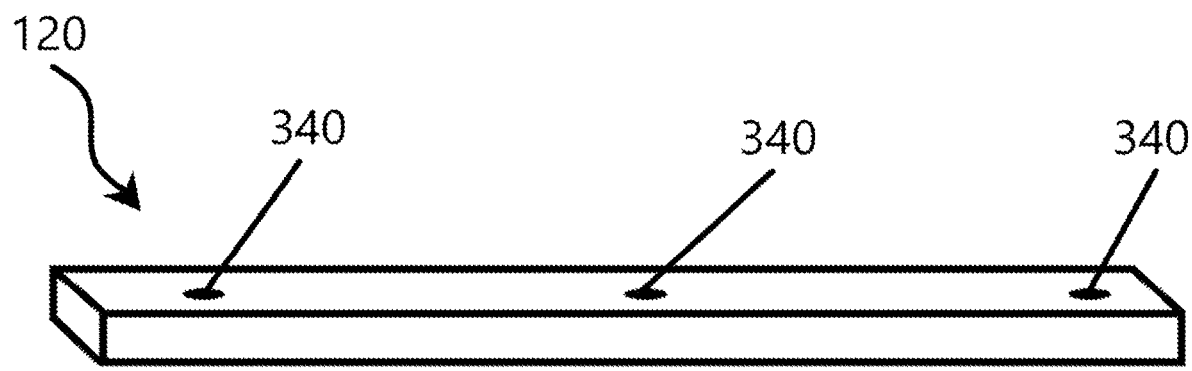
FIG. 11 is a view of the top bar showing the top bar attachment channels.

FIGS. 10 and 11 show views of the top bar 120. The top bar 120 includes a top bar channel 350 which connects the top bar to the top block assembly 140. The top bar 120 may also include pre-drilled attachment holes or channels 340 on its surface for attaching attachments 210, which may include rod holders, instruments, panels, and flags. The top bar 120 may be made from any metal or hard plastic or polymer. In one embodiment the top bar 120 is made from aluminum or an aluminum alloy. The top bar 120 may be any length, but in one embodiment may be between 12 to 30 inches long. In one embodiment the top bar 120 is between 0.5 and 1.5 inches thick and between 2 to 4 inches wide.

Figure 6:
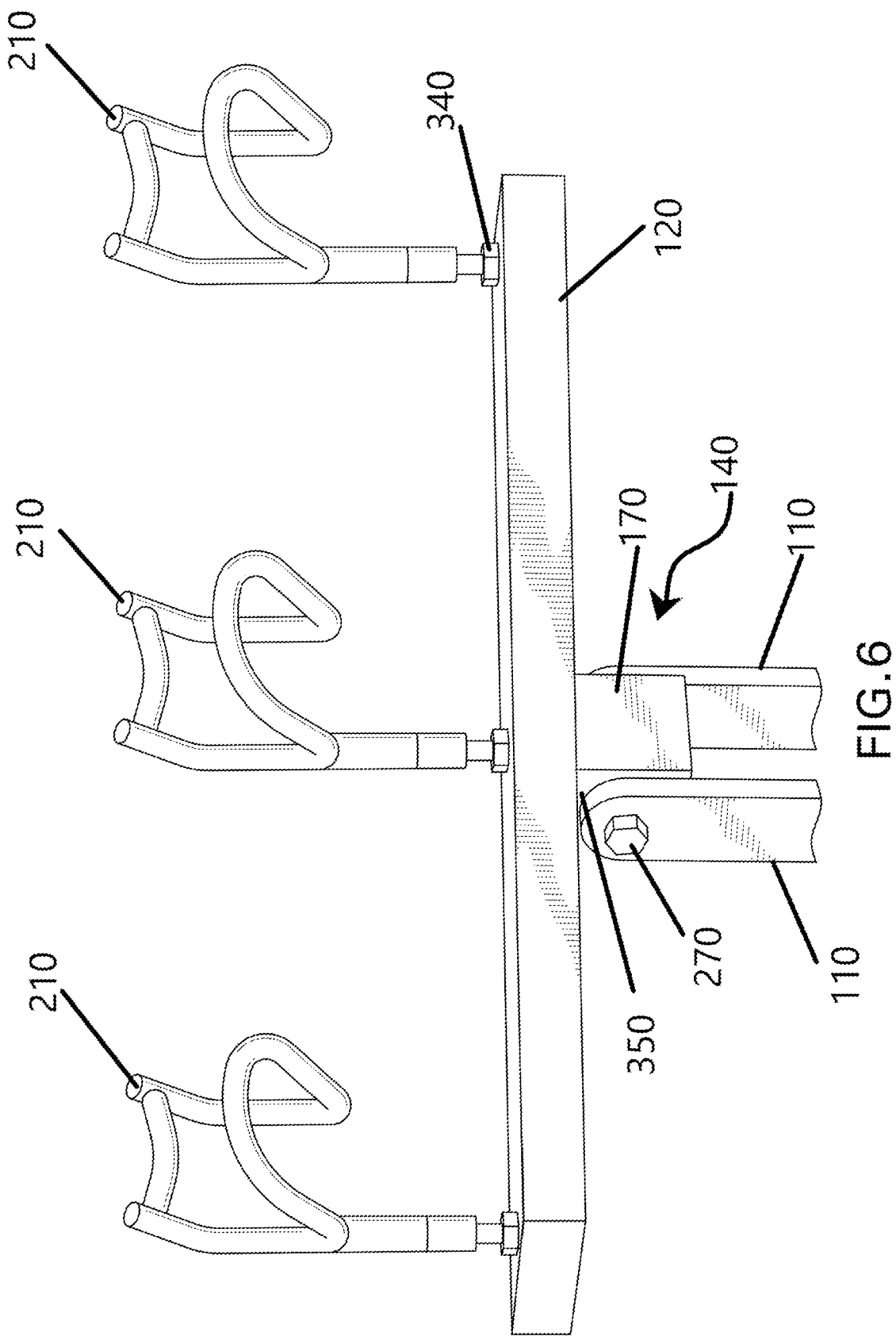
FIG. 6 is a top block assembly with a top bar.
Figure 9:
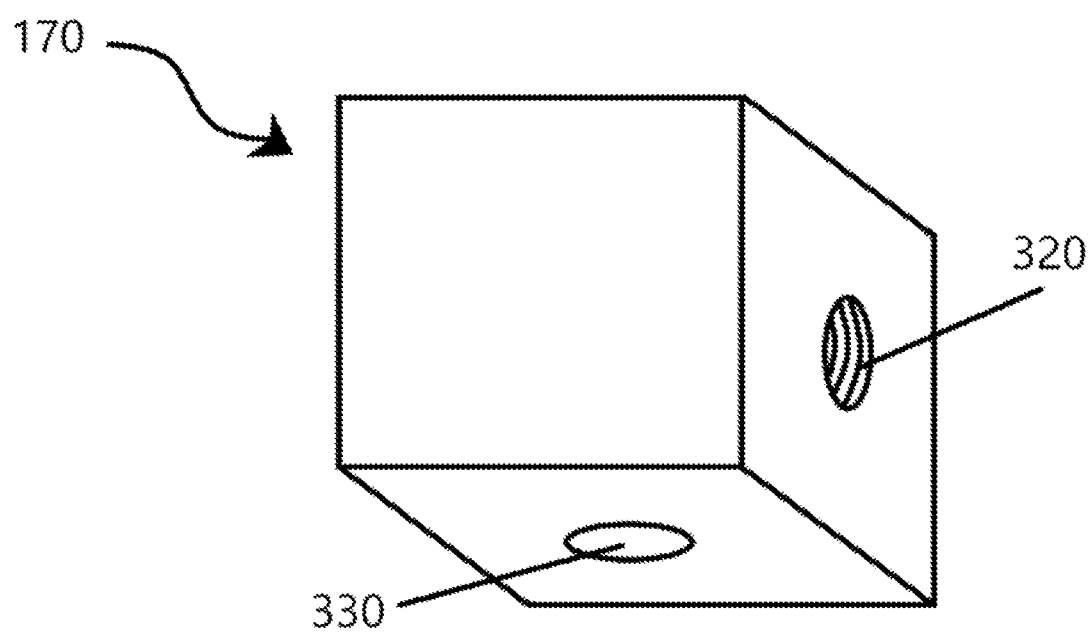
FIG. 9 is a top block.

The top block assembly 140 includes a top block 170 as shown on FIGS. 6 and 9, which may include a top block side channel 320 and a top block bar channel 330. The top block 170 may be a rectangular prism with six faces, wherein each of the six faces are connected with right angles to form the rectangular prism shape. The top block 170 may be a rectangular prism which is cubical, with each face having a square shape. The top block 170 connects to the top bar 120 via the top block bar bolt 240 through the top block bar channel 330. The top block bar channel 330 may be threaded or unthreaded. An unthreaded top block bar channel 330 allows for free movement of the top block 170 about the top block bar bolt 240. The top block bar bolt 240 goes through the top block bar channel 330 and screws into the top bar 120 in the top bar channel 350. In an embodiment in which the top block bar channel 330 does not have threads which engage the top block bar bolt 240, the top block bar bolt 240 can move freely within the top block bar channel 330, and the top bar 120 rotates about the axis of the top block bar bolt 240 independently of the top block 140. The top block bar bolt 240 is longer than a height of the top block 170 so that it travels through the top block 170 and attaches to the top bar 120.

Figure 7:
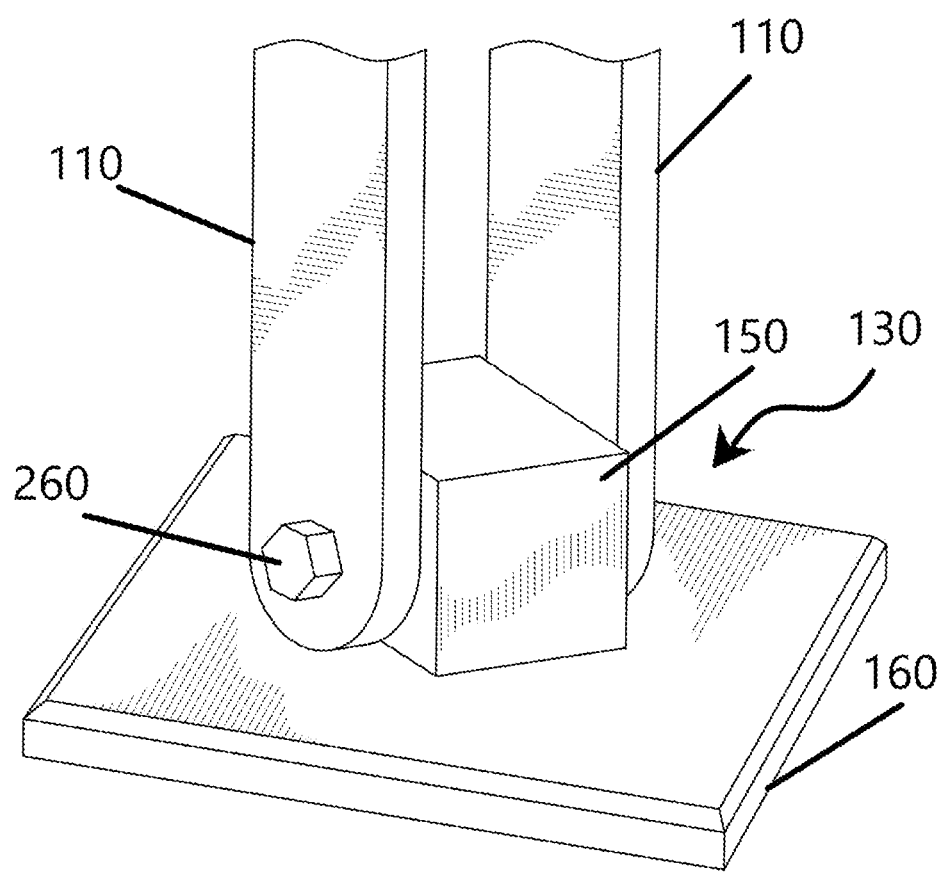
FIG. 7 is a base block assembly connected to a base plat.
Figure 8:
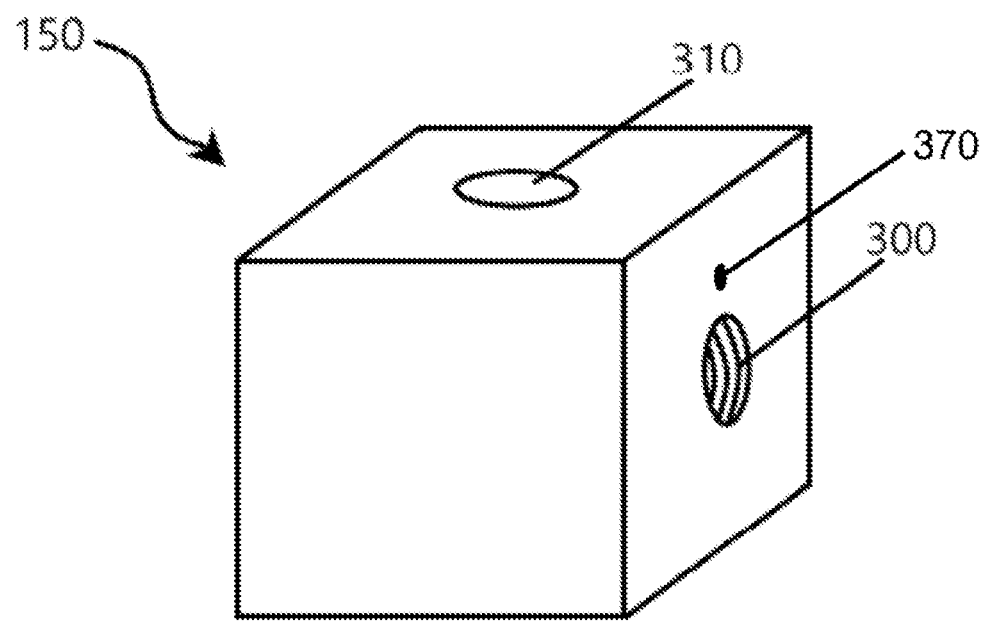
FIG. 8 is a base block.

The base block assembly 130 includes a base block 150 as shown on FIGS. 7 and 8, which may include a base block side channel 300 and a base block base channel 310. The base block 150 may be a rectangular prism with six faces, wherein each of the six faces are connected with right angles to form the rectangular prism shape. The base block 150 may be a rectangular prism which is cubical, with each face having a square shape. The base block 150 connects to the base plate 160 via the base block base bolt 250 through the base block base channel 310. The base block base channel 310 may be threaded or unthreaded. An unthreaded base block base channel 310 allows for free movement of the base block 150 about the base block base bolt 250. The base block base bolt 250 goes through the base block base channel 310 and screws into the base plate 160. In an embodiment in which the base block base channel 310 does not have threads which engage the base block base bolt 250, the base block base bolt 250 can move freely within the base block base channel 310, and the base block 150 rotates about the axis of the base block base bolt 250 independently of the base plate 160. The base block base bolt 250 is longer than a height of the base block 150 so that it travels through the base block 150 and attaches to the base plate 160.

The top block 170 includes at least one top block side channel 320, and the base block 150 includes at least one base block side channel 300 to connect to the at least one rounded arm 110 as shown in FIG. 7.

The at least one rounded arm 110 is includes a rounded arm channel 360 at an upper location and at a lower location of the at least one rounded arm 110. The channels 360 may be threaded or unthreaded. In one embodiment, the channels 360 are unthreaded and through the channel 360 at the upper location a top block side bolt 270 travels and connects to the top block side channel 320 of the top block 170. The top block side channel 320 is threaded and the top block side bolt 270 secures to the top block 170 via the threaded connection of the top block side bolt 270 and the top block side channel 320. Similarly, in one embodiment, through the channel 360 at the lower location, a base block side bolt 260 travels and connects to the base block side channel 300 of the base block 150. The base block side channel 300 is threaded and the base block side bolt 260 secures to the base block 150 via the threaded connection of the base block side bolt 260 and the base block side channel 300. The at least one rounded arm 110 rotates around the axis of the base block side bolt 260 independently of the base block 150 and rotates around the axis of the top block side bolt 270 independently of both the top block 170.

In the alternative, the channels 360 at the upper location and lower location of the at least one rounded arm 110 may include threading or counter threading to secure the at least one rounded arm 110 with respect to the top block 170 and base block 150.

In the alternative, the base block base channel 310 and the top block bar channel 330 may include counter threading to allow of the top bar 120, the at least one rounded arm 110, and the base plate 160 to secure tightly. The positioning of the rod rack 100 may also be secured by a lock, bolt, screw, or other fastener. In one embodiment, the fastener may include at least one stainless-steel bolt. In another embodiment, a set screw 280, 290 may be added to at least one of the upper and lower sections of the at least one rounded arm 110 or may be added to a middle of the top bar 120 to anchor into the soft aluminum of the top block 170 or base block 150, if at any point additional strength is needed. The set screw 280, 290 may form a depression or series of depressions in the base block 150, wherein the set screw 280, 290 or other pin is selectably located in the depression or one depression of the series of depressions to lock the at least one rounded arm 110 at an angle relative to the base block 150.

The at least one rounded arm 110 may include a corner or a flat edge 190 which is not rounded. This may serve as a lock in the direction of the corner or flat edge 190 such that if the rod rack 100 was pulled in the direction of the fish, the corner or flat edge 190 of the at least one rounded arm 110 would catch on an edge of the base plate 160, lock, or other feature at the base plate 160 or top bar 120 to keep the rod rack 100 from pivoting toward the force of the bite, providing stability of the rod 180 in that direction and reducing the risk of losing the rod and reels 180.

The rod rack 100 disclosed herein may also be removed from the boat 200 and fold up quickly and compactly for storage during the rest of the boat ride. The rod rack 100 may be attached to the boat 200 with one bolt, the base block base bolt 250. Moreover, the base 160 may be a base plate 160 and may remain on the boat for easy installation and removal of the rod rack 100. The base plate 160 may include one or more base connector holes 230 for hardware to sit in allowing a flush, smooth base plate 160 which doesn't interfere with any other enjoyment of the boat 200. In one embodiment, the base plate 160 is a low profile base plate and between 0.5 inches to 1.5 inches tall. FIG. 3 shows the base plate 160 with a base channel 220 and base connector holes 230 in each corner of the baseplate 160. The base plate 160 may be of any shape and size. The base plate 160 may be flat or may be of a U-shape to secure on the side of a boat or other vehicle 200. In one embodiment the base 160 is a square or rectangular shape. Additional base plates 160 may also be mounted to the base plate 160 safely and securely since the base plate 160 may have a smooth lateral service. The base plate 160 may be painted to match the boat or other vehicle 200 to which it is attached so that it does not stand out or draw attention to the base plate 160 when the rod rack 100 is not in use. The rod rack 100 may be used for different types of fishing. Although, typically different rod racks are used to target different species and different fishing techniques, the rod rack 100 disclosed herein may include the strength and versatility required for both trolling and spyder rigging. The components of the rod rack 100 may be composed of solid aluminum or aluminum alloy, making the rod rack 100 an exceptionally strong rod rack 100, particularly when compared to a hollow rod rack 100. However, the rod rack 100 disclosed herein also includes the adjustability not generally found combined with the strong rod racks 100. For example, the rod rack 100 may be used on the back of a boat as a trolling rack to catch catfish, bump, or snag for spoonbill. The rod rack 100 may also be swapped to the front of the boat to use for spider rigging to catch crappie.

The rod rack 100 also may be used in a variety of waters. The rod rack 100 may be composed of solid aluminum or aluminum alloy, suitable for lake, river, and ocean.

In a further embodiment, the rack 100 may be smaller in size. An attachment 210 to the top bar 120 may include a top platform to hold other items besides fishing rods, such as navigation systems, computers, screens, or other equipment 180.

In another embodiment, the rack 100 may be fitted on the surface of any vehicle 200, which may include a boat, automobile, truck, four-wheeler, and golf cart.

The invention claimed is:

1. A rod rack for mounting to a vehicle, comprising:
a base plate;
at least one arm;
a base block assembly connecting the at least one arm to the base plate, wherein the base block assembly further comprises:
  a base block, wherein the base block is a rectangular prism with six sides;
  a base plate connector attaching the base block to the base plate, wherein the base plate connector is installed in a top of the base block and through the base block and attached to the base plate, wherein the base block rotates freely about the base plate connector on the base plate;
  a base lateral connector through the at least one arm and attaching to a first side of the six sides of the base block, wherein the at least one arm rotates freely about the first side of the base block;
  a base lock to set a location of the at least one arm at a fixed position relative to the base block;
a top bar;
a top block assembly connecting the top bar to the at least one arm, wherein the top block assembly further comprises:
  a top block, wherein the top block is a rectangular prism with six sides;
  a top bar connector attaching the top block to the top bar, wherein the top bar rotates freely around top bar connector on the top block;
  a top lateral connector through the at least one arm and attaching to a first side of the six sides of the top block, wherein the at least one arm rotates freely about the first side of the top block; and
  a top lock to set a location of the at least one arm at a fixed position relative to the top block.

2. The rod rack of claim 1, wherein the at least one arm includes two parallel arms, wherein the base lateral connector connects the two parallel arms to opposite lateral sides of the base block, and wherein the top lateral connector connects the two parallel arms to corresponding opposite lateral sides of the top block.

3. The rod rack of claim 1, wherein the at least one arm has rounded edges for complete range of motion about the top block assembly and the base block assembly.

4. The rod rack of claim 1, wherein the at least one arm includes a square edge at at least one end of the at least one arm to block complete rotation of the at least one arm about the side of the base block.

5. The rod rack of claim 1, wherein the base block includes a base block base channel which is unthreaded, through which the base plate connector is installed and attaches to the base plate via a threaded connection, such that the base block moves about an axis of the base plate connector independent from the base plate.

6. The rod rack of claim 1, wherein the top block includes a top block bar channel which is unthreaded, through which the top bar connector is installed and attaches to the top bar via a threaded connection, such that the top bar moves about an axis of the top bar connector independent from the top block.

7. The rod rack of claim 1, wherein the at least one arm includes at least one unthreaded arm channel, through which the base lateral connector is installed and attaches to the base block assembly via a threaded connection, such that the at least one arm rotates about the base lateral connector independent from the base block assembly.

8. The rod rack of claim 1, wherein at least one selected from the group of the top block, the base block, and the at least one arm include counter-threading to lock the position of the rod rack in place.

9. The rod rack of claim 1, wherein at least one selected from the group of the base lock and the top lock includes a manual tightening screw at a corresponding lateral connector or a set screw adjacent to the corresponding lateral connector.

10. The rod rack of claim 1, wherein the base lock includes a pin through the at least one arm corresponding to a series of depressions in the base block, wherein the pin is selectably located in one of the series of depressions to lock the at least one arm at an angle relative to the base block.

11. The rod rack of claim 1, wherein the base plate is a low-profile base plate between 0.5 and 1.5 inches tall.

12. The rod rack of claim 1, wherein the base plate attaches to a surface of the vehicle, and wherein the base plate connector is removable from the base plate, leaving the base plate attached to the surface of the vehicle.

13. The rod rack of claim 1, wherein the vehicle is at least one selected from the group of a watercraft, an automobile, an ATV, a truck, a golf cart, and a tractor.

14. The rod rack of claim 1, wherein at least one selected from the group of a rod holder, an instrument, a panel, a computer, a navigation system, a flag, and a screen is attached to the top bar.

15. The rod rack of claim 1, wherein at least one selected from the group of the base block and the top block are cubical.

16. The rod rack of claim 1, wherein the at least one arm includes at least one unthreaded arm channel, through which the top lateral connector is installed and attaches to the top block assembly via a threaded connection, such that the at least one arm rotates about the top lateral connector independent from the top block assembly.

17. The rod rack of claim 1, wherein at least one selected from the group of the base block and the top block is a solid, metal block.

18. The rod rack of claim 17, wherein the at least one selected from the group of the base block and the top block is a solid, aluminum block.

19. A method of installing a rod rack to a vehicle, comprising:
   providing a rod rack assembly, comprising:
      at least one arm;
      a base block assembly further comprising:
         a base block with an open channel from a top of the base block through to a bottom of the base block, wherein the base block is a rectangular prism with six sides;
         a base lateral connector through the at least one arm and a first side of the six sides of the base block, wherein the at least one arm rotates freely about the first side of the base block;
         a base lock to set a location of the at least one arm at a fixed position relative to the base block;
      a top bar;
      a top block assembly connecting the top bar to the at least one arm,
      wherein the top block assembly further comprises:
         a top block, wherein the top block is a rectangular prism with six sides;
         a top bar connector attaching the top block to the top bar, wherein the top bar rotates freely around top bar connector on the top block;
         a top lateral connector through the at least one arm at a first side of the six sides of the top block, wherein the at least one arm rotates freely about the first side of the top block; and
         a top lock to set a location of the at least one arm at a fixed position relative to the top block;
   attaching a low-profile base plate to a surface of the vehicle;
   connecting the rod rack assembly to the base plate, including placing a base plate connector through the open channel in the base block and connecting it to the base plate, wherein the base block rotates freely about the base plate connector on the base plate.

20. The method of installing a rod rack to the vehicle of claim 19, including providing at least one selected from the group of the base block and the top block are solid aluminum rectangular prisms, and applying a set screw to the at least one arm adjacent to the corresponding lateral connector to deform and create a depression in the at least one selected from the group of the base block and the top block, to lock the at least one arm into place relative to the at least one selected from the group of the base block and the top block.

* * * * *